United States Patent
Riha (10) Patent No.: US 8,261,314 B2
(45) Date of Patent: Sep. 4, 2012

(54) APPARATUS AND METHOD FOR MANAGING MEDIA CONTENT PRESENTATION

(75) Inventor: William Riha, Naperville, IL (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 551 days.

(21) Appl. No.: 12/561,775

(22) Filed: Sep. 17, 2009

(65) Prior Publication Data

US 2011/0067080 A1 Mar. 17, 2011

(51) Int. Cl.
*H04N 7/173* (2011.01)
(52) U.S. Cl. .......................................... 725/119; 725/116
(58) Field of Classification Search .......................... None
See application file for complete search history.

(56) References Cited

U.S. PATENT DOCUMENTS

| | | | | |
|---|---|---|---|---|
| 5,333,299 A | * | 7/1994 | Koval et al. | 713/400 |
| 7,346,698 B2 | * | 3/2008 | Hannaway | 709/231 |
| 7,412,533 B1 | * | 8/2008 | Johnson et al. | 709/231 |
| 7,614,070 B2 | * | 11/2009 | Urdang et al. | 725/90 |
| 2004/0250273 A1 | * | 12/2004 | Swix et al. | 725/25 |
| 2011/0209175 A1 | * | 8/2011 | Bassali et al. | 725/32 |

* cited by examiner

*Primary Examiner* — Brian Pendleton
*Assistant Examiner* — Fernando Alcon
(74) *Attorney, Agent, or Firm* — Guntin Meles & Gust, PLC; Pablo Meles (57) ABSTRACT

A system that incorporates teachings of the present disclosure may include, for example, a gateway including a controller adapted to transmit media content to a group of set top boxes that are associated with a premises and that each have a presentation device connected thereto where the presentation devices are in proximity to each other, receive a plurality of streams of the media content from a media server where the streams are of the same media content, and apply a delay compensation to delivery of the plurality of streams to one or more set top boxes of the group of set top boxes to synchronize presentation of the media content at each of the presentation devices, where the delay compensation is based on a transmission delay and a receipt delay, where the transmission delay is between each of the group of set top boxes and the gateway, and where the receipt delay is between the gateway and the media server. Other embodiments are disclosed.

20 Claims, 5 Drawing Sheets

APPARATUS AND METHOD FOR MANAGING MEDIA CONTENT PRESENTATION

FIELD OF THE DISCLOSURE

The present disclosure relates generally to communication systems and more specifically to an apparatus and method for managing media content presentation.

BACKGROUND

Establishments, including residences, often have more than one TV or other media presentation device. These TV's can present different media content but can also be used to present the same media content. The source of the media content is often from the same service provider.

DETAILED DESCRIPTION

One embodiment of the present disclosure can entail a computer-readable storage medium comprising computer instructions to receive a plurality of streams of media content from a media server where the streams are of the same media content, receive a selection of a group of set top boxes to be synchronized for presentation of the media content where the group of set top boxes are associated with a premises and each have presentation devices connected thereto that are in proximity to each other, determine a transmission delay between each of the set top boxes and the gateway for the media content, determine a receipt delay between the gateway and the media server for each of the plurality of streams, determine a delay compensation based on the transmission and receipt delays, record a first stream of the plurality of streams at a DVR of a first set top box of the group of set top boxes, and provide the first stream from the DVR to the first set top box at a time that is determined based on the delay compensation.

Another embodiment of the present disclosure can entail a gateway comprising a controller adapted to transmit media content to a group of set top boxes that are associated with a premises and that each have a presentation device connected thereto where the presentation devices are in proximity to each other, receive a plurality of streams of the media content from a media server where the streams are of the same media content, and apply a delay compensation to delivery of the plurality of streams to one or more set top boxes of the group of set top boxes to synchronize presentation of the media content at each of the presentation devices, where the delay compensation is based on a transmission delay and a receipt delay, where the transmission delay is between each of the group of set top boxes and the gateway, and where the receipt delay is between the gateway and the media server.

Yet another embodiment of the present disclosure can entail a method including transmitting a plurality of streams of media content from a media server to a gateway where the streams are of the same media content, and applying a delay compensation at the media server for delivery of the plurality of streams to one or more set top boxes of a group of set top boxes to synchronize presentation of the media content by each of the set top boxes, where the set top boxes are associated with a premises and each have a presentation device connected thereto, where the presentation devices are in proximity to each other, where the delay compensation is based on a transmission delay and a receipt delay, where the transmission delay is between each of the group of set top boxes and the gateway, and where the receipt delay is between the gateway and the media server.

Figure 1:
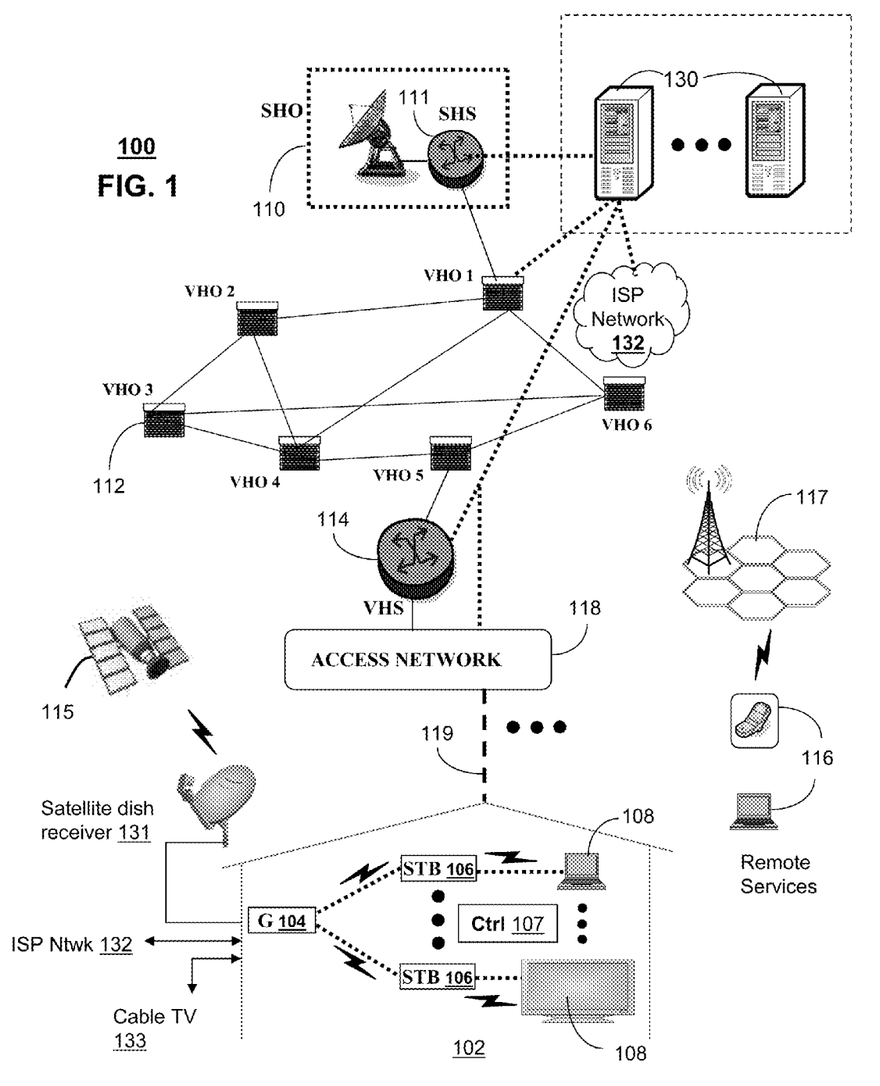
FIG. 1 depicts an illustrative embodiment of a communication system that provides media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive media content services.

Figure 2:
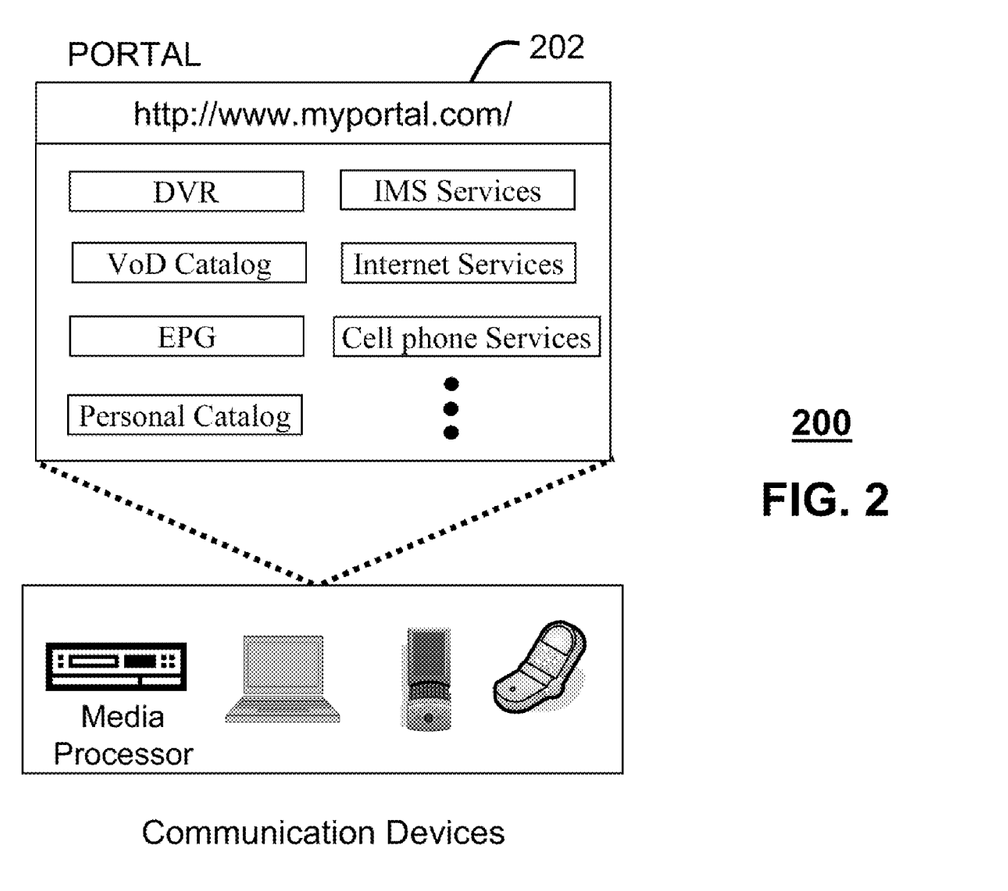
FIG. 2 depicts an illustrative embodiment of a portal interacting with the communication system of FIG. 1.

FIG. 2 depicts an illustrative embodiment of a portal 202 which can operate from the computing devices 130 described earlier of communication system 100 illustrated in FIG. 1. The portal 202 can be used for managing services of communication system 100. The portal 202 can be accessed by a Uniform Resource Locator (URL) with a common Internet browser such as Microsoft's Internet Explorer™ using an Internet-capable communication device such as those described for FIG. 1. The portal 202 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 3:
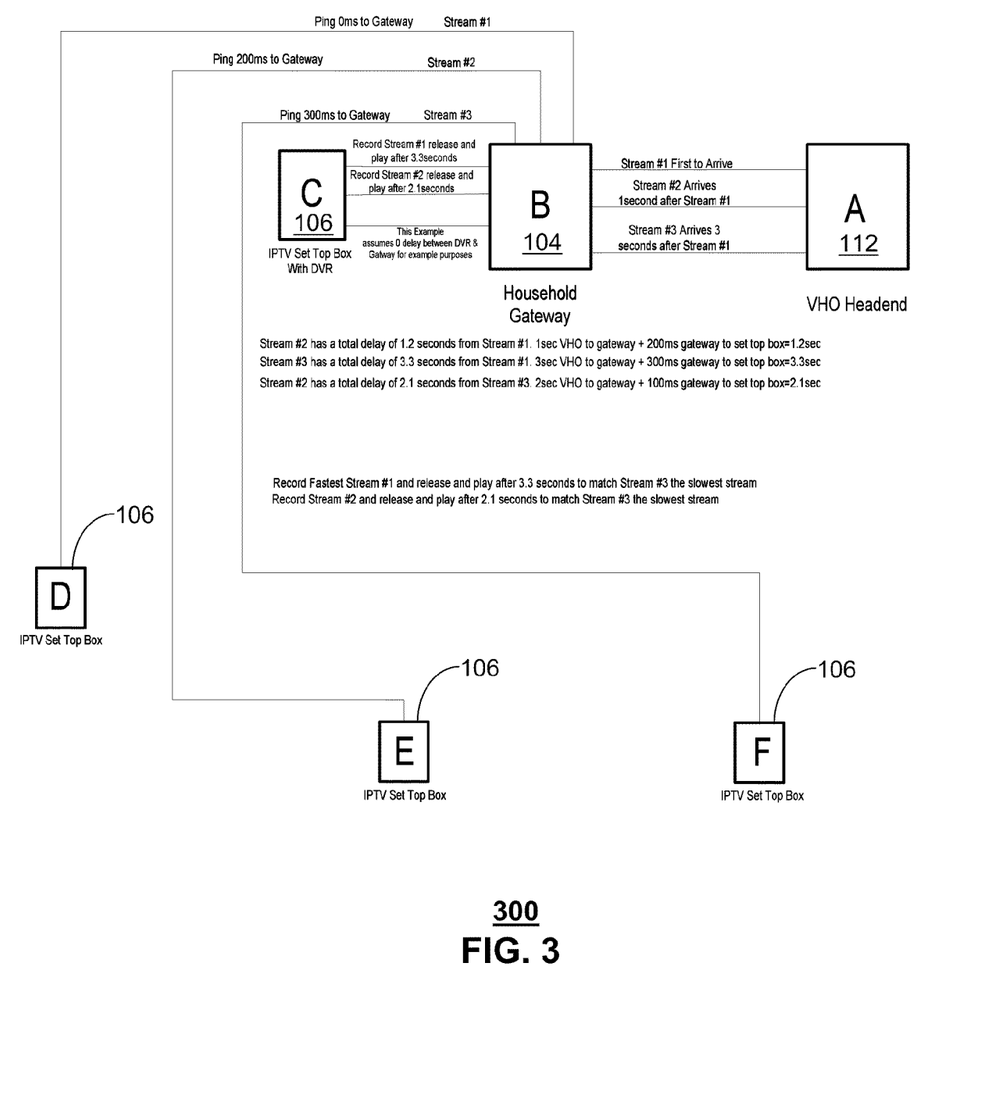
FIG. 3 depicts an illustrative embodiment of a communication system that provides media services.

FIG. 3 depicts an exemplary embodiment of a communication system 300 for delivering media content. Communication system 300 can be overlaid or operably coupled with communication system 100 as another representative embodiment of said communication systems. System 300 can include a VHO headend 112 or other backend server that distributes media content to gateways, such as residential gateway 104. The gateways 104 can be in communication with various network devices as well as various customer premises equipment, such as STB's 106 for the delivery of voice, video and data services.

System 300 can utilize various protocols, techniques and combinations thereof for transmitting the requested media content to the gateway 104, including hardwire links and wireless communication such as WiFi, WiMax, GPRS, 3G, 4G and so forth. System 300 can also utilize various protocols, techniques and combinations thereof for transmitting the requested media content to various points throughout the system, including use of an IPTV access network, the public Internet, and/or an IMS network.

In one embodiment, a plurality of STB's 106 are connected to a gateway 106, such as in a residence or a commercial establishment. The STB's 106 and the media presentation devices connected thereto can be in proximity to each other so that users can be presented with the media content from two or more of the devices. For example, multiple TV's that are each connected to STB's 106 can be close enough so that a user can hear and/or see the media content from each of the TV's. System 300 can synchronize the presentation of media content from the STB's so that if the TV's are on the same channel then the same audio and/or video content will be presented at the same time.

In one embodiment, the fastest IPTV signals can be delayed using a Digital Video Recorder (DVR) of one of the STB's 106. For example, the user during setup can program the gateway 104 to let it know which STB's should be synchronized together if watching the same channel. The gateway 104 can then determine the delay associated with delivering the media content from the gateway to each of the STB's 106. For instance, the gateway can ping each STB 106 including the STB with the DVR to calculate the delay between the STB and gateway 104. These delays can be due to different wiring distances to individual STB's throughout the premises. The gateway 104 can then determine which streams from the VHO headend 112 are to be synchronized and can determine the slowest of these streams.

In one embodiment, the gateway 104 can calculate the differences in timing of the other streams in respect to this slowest stream. The gateway 104 can send the faster streams to the DVR to be recorded and can release these streams for play at the individual STB's after applying delay compensating using the delay calculation. The delay calculation can be the VHO headend to gateway delay plus the gateway to STB delay. For example as shown in FIG. 3, stream one is first to arrive at the gateway 104 and thus is the fastest stream, while stream two has a one second delay (arrives one second after stream one) and stream three has a three second delay (arrives three seconds after stream one). The gateway 104 can determine a delay calculation by combining the stream delay data with the gateway to STB delay data. The exemplary calculation results in stream one being recorded and then transmitted with a 3.3 second delay to match the slowest stream (i.e., stream three), while stream two is recorded and then transmitted with a 2.1 second delay to match the slowest stream. In this example, the slowest signal passes thru the gateway 104 to its respective STB 106. Once the recorded signal is released from the DVR, the media content can be erased unless the user wants to save the recording of one of the streams. All individual IPTV streams are now arriving at their respective STB's at the same time.

Periodic timing or delay checks can be applied to the VHO incoming streams to make sure the delays have not changed. In one embodiment, the frequency of the time checks can be adjusted and based on a number of factors including the length of the media content, the type of media content, reported difficulties in the network, and/or historical data associated with the gateway, STB's, network elements and so forth. In another embodiment, the frequency of the time checks can be adjusted by the VHO headend 112 or another service provider component. For instance, the network management can determine that undesired conditions are being experienced in a portion of the network and can communicate timing control signals to one or more gateways in the effected area of the network. The timing control signals can instruct the gateways 104 to perform more frequent timing checks.

In another embodiment, the DVR of one of the STB's can again be utilized to eliminate delay but records only one IPTV stream or two if using HD and standard definition mixed. For example, the user during setup can program the gateway 104 to let it know which STB's 106 are to be synchronized together if watching the same channel. The gateway 104 can then ping each STB including the DVR to calculate the delay between the STB and the gateway. The gateway 104 can then use only the one stream or use only the two streams (one HD and one standard definition) sent from the VHO headend 112. The gateway 104 can have the DVR start to record each stream and start to stream the recorded stream to each of the synchronized STB's that were selected after applying the delay that was determined during the pinging process. The recorded media content can then be deleted unless otherwise indicated to be saved. This technique can allow a user to use more than two HD televisions in high-definition while watching the same channel since it is an actual recorded stream.

In another embodiment, synchronization of the streams can be performed at the VHO headend 112. For example, the VHO headend 112 can synchronize all of the streams for a selected combination of set top boxes selected by the user during setup. All streams can arrive at the gateway 104 at the same time. The gateway 104 can ping all STB's 106 and transmit delay data to the VHO headend 112 so that the corresponding delay can be applied to each of the IPTV streams.

Figure 4:
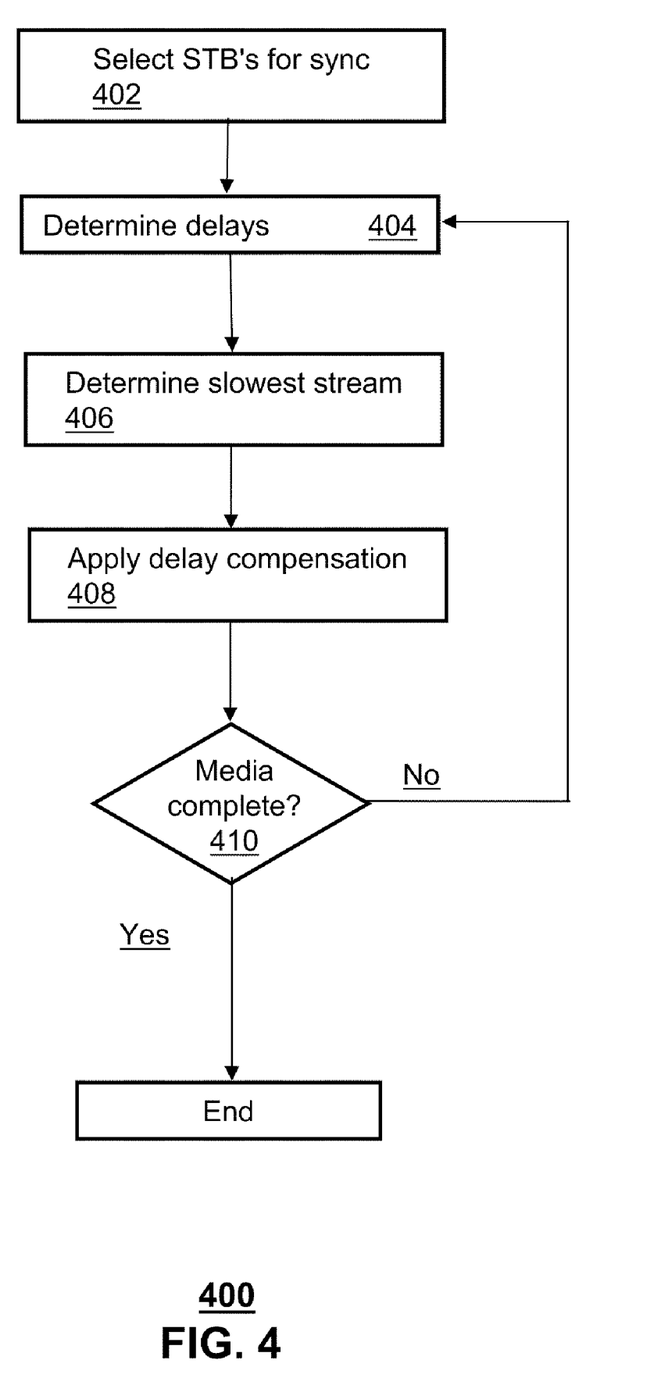
FIG. 4 depicts an illustrative embodiment of a method operating in portions of the communication systems of FIGS. 1 and 3.

FIG. 4 depicts an illustrative method 400 operating in portions of communication systems 100 and 300. Method 400 can begin with step 402 in which the STB's that are to be synchronized are determined. For instance, the user can select two or more STB's from a group of STB's of the premises for synchronization. In one embodiment, a synchronization GUI can be presented by one of the STB's of the group of STB's so that a user can select the devices to be synchronized. For example, the GUI can present the STB's available for synchronization based on a detection being performed by the gateway 104 and/or one or more of the STB's. The detection process can include pinging available devices to determine which channels are available for viewing on each STB to determine if synchronization is necessary.

In another embodiment, one or more of the STB's can have location processing capabilities so that the STB's can be mapped and a determination of the necessity for synchronization can be performed. For instance, a location of each of the STB's can be calculated by one or more of the STB's and/or by the gateway and then a determination of whether a user would see and/or hear overlapping media content from two or more of the STB's can be made. The particular location techniques and components can vary and can include RF, GPS and so forth.

In step 404, the delays associated with transmission of the media content from the gateway 104 to each of the STB's 106 can be determined. This can be done by the gateway pinging each of the STB's, although other techniques are also contemplated by the present disclosure, including the STB's providing periodic delay data to the gateway. In step 406, the gateway can determine the slowest stream of media content that is being received from the VHO headend 112. In step 408, the gateway can apply the delay compensation to the delivery of the media content to each of the STB's so that the media content arrives at the STB at the same time. For instance, the gateway 104 can combine the calculated delay associated with each STB along with the delay associated with the difference between the fastest and slowest streams. This combined delay can then be utilized by a DVR associated with one of the STB's for providing the media content to each of the STB's. In this example, the DVR can record the media content of the fastest streams and then release the streams to each of the STB's with the appropriate delay compensation being applied so that each of the fastest streams are provided to their corresponding STB's at the same time as the slowest stream is provided to its STB.

In step 410, the gateway determines if the media content presentation is complete. If presentation is not complete then the DVR can continue to release the media content with the appropriate delay being added to each stream to achieve presentation synchronization at each STB. If the media content is complete then method 400 can end.

Upon reviewing the aforementioned embodiments, it would be evident to an artisan with ordinary skill in the art that said embodiments can be modified, reduced, or enhanced without departing from the scope and spirit of the claims described below. For example, the delay compensation can be applied at each of the STB's receiving the streams rather than at the DVR that receives and distributes each of the streams. For example, each of the STB's can have their own DVR for receiving one of the streams. A delay compensation can be determined by the gateway and/or by the STB's and then applied at each DVR so that synchronization of presentation is achieved. In this example, each DVR can record the stream as it is received from the gateway and can present the media content using the delay compensation.

In another embodiment, a combination of STB's with DVR's and STB's without DVR's can be used to synchronize presentation of the media content. For instance, each of the STB's with DVR's can receive their corresponding stream and can apply the delay compensation directly, while one or more of those DVR's with STB's can be used for recording the streams and releasing to the other STB's that do not have DVR's (with the corresponding delay compensation being applied). In yet another embodiment, other memory devices can be utilized for recording and distributing the media content with the appropriate delay, including hard drives associated with other computing devices that are in communication with the group of set top boxes at the premises. These other computing devices can be located at the premises, such as a personal computer, or can be located remote from the premises such as a backend server or gateway of another premises.

Other suitable modifications can be applied to the present disclosure without departing from the scope of the claims below. Accordingly, the reader is directed to the claims section for a fuller understanding of the breadth and scope of the present disclosure.

Figure 5:
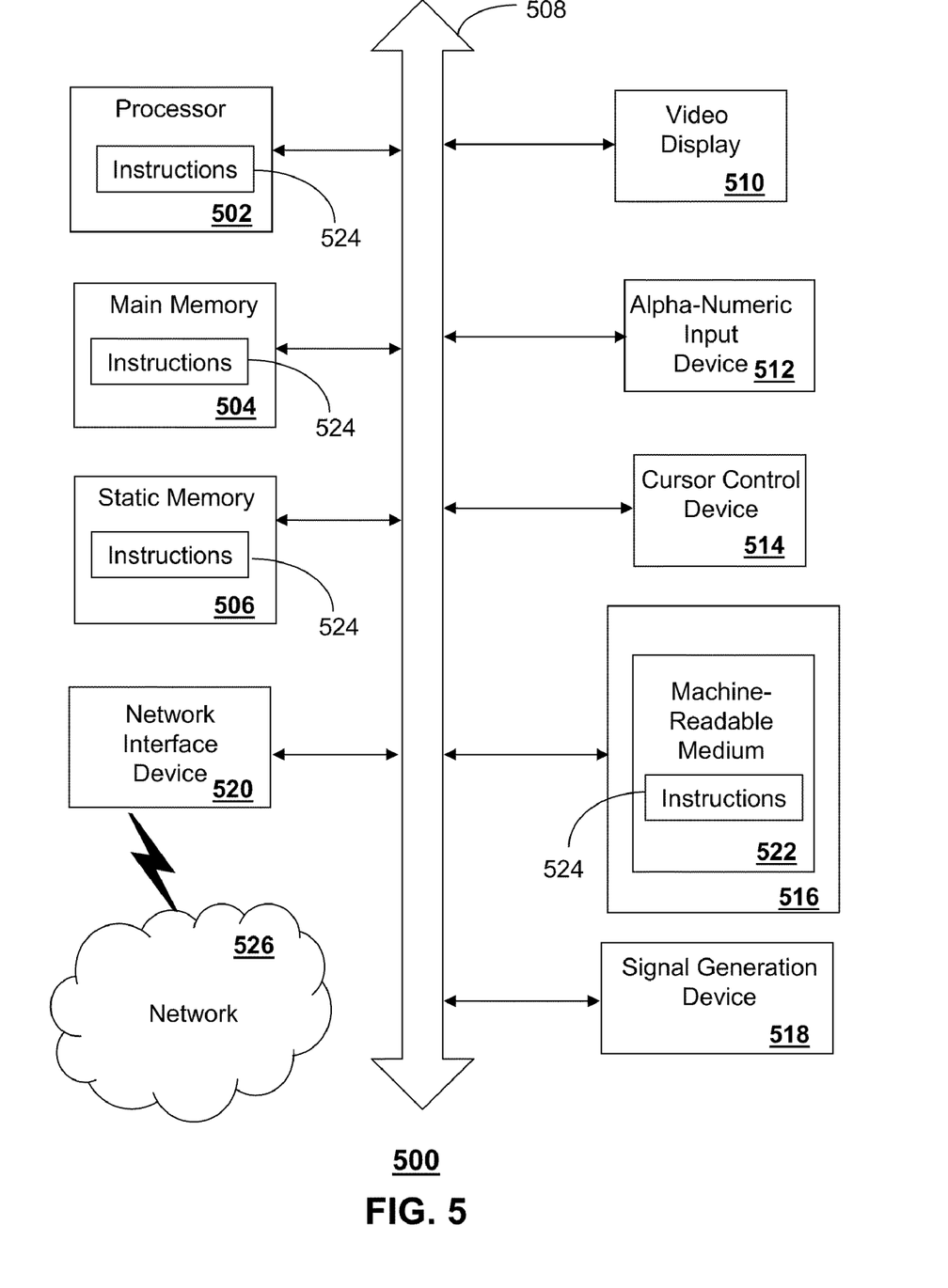
FIG. 5 is a diagrammatic representation of a machine in the form of a computer system within which a set of instructions, when executed, may cause the machine to perform any one or more of the methodologies discussed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium comprising computer instructions which, responsive to being executed by at least one processor, cause the at least one processor to:
receive at a gateway associated with a premises, a plurality of streams of media content from a media server, the streams being of the same media content;
receive a selection of a group of set top boxes to be synchronized for presentation of the media content, the group of set top boxes being associated with the premises and each having presentation devices connected thereto that are in proximity to each other;

determine a transmission delay between each of the set top boxes and the gateway for the media content;
determine a receipt delay between the gateway and the media server for each of the plurality of streams;
determine a delay compensation based on the transmission and receipt delays;
record a first stream of the plurality of streams at a digital video recorder of a first set top box of the group of set top boxes; and
provide the first stream from the digital video recorder to the first set top box at a time that is determined based on the delay compensation.

2. The non-transitory computer-readable storage medium of claim 1, comprising computer instructions which when executed by the at least one processor cause the at least one processor to perform operations comprising providing a second stream of the plurality of streams from the gateway to a second set top box of the group of set top boxes without applying the delay compensation.

3. The non-transitory computer-readable storage medium of claim 2, wherein the second stream is a slowest stream of the plurality of streams.

4. The non-transitory computer-readable storage medium of claim 1, wherein the delay compensation for a fastest stream of the plurality of stream is higher than other streams of the plurality of streams.

5. The non-transitory computer-readable storage medium of claim 1, wherein the selection is received at the gateway from one of the set top boxes.

6. The non-transitory computer-readable storage medium of claim 1, comprising computer instructions which when executed by the at least one processor cause the at least one processor to determine the transmission delay using a ping that is sent from the gateway to each of the set top boxes.

7. A gateway comprising:
a memory storing computer instructions; and
a controller coupled to the memory, wherein the controller, responsive to executing the computer instructions, performs operations comprising:
transmitting media content to a group of set top boxes that are associated with a premises and that each have a presentation device connected thereto, the presentation devices being in proximity to each other;
receiving at the gateway associated with the premises, a plurality of streams of the media content from a media server, the streams being of the same media content; and
applying a delay compensation to delivery of the plurality of streams to one or more set top boxes of the group of set top boxes to synchronize presentation of the media content at each of the presentation devices, wherein the delay compensation is based on a transmission delay and a receipt delay, wherein the transmission delay is between each of the group of set top boxes and the gateway, and wherein the receipt delay is between the gateway and the media server.

8. The gateway of claim 7, wherein the controller, responsive to executing the computer instructions, performs operations comprising determining at least one of the transmission delay or the receipt delay.

9. The gateway of claim 7, wherein the controller, responsive to executing the computer instructions, performs operations comprising transmitting a delay signal to a digital video recorder of one of the set top boxes, wherein the digital video recorder records at least one of the plurality of streams or provides the stream to a portion of the set top boxes at a time based on the delay compensation.

10. The gateway of claim 7, wherein the transmission delay is determined by one or more of the set top boxes.

11. The gateway of claim 7, wherein the delay compensation for a fastest stream of the plurality of stream is higher than other streams of the plurality of streams.

12. The gateway of claim 7, wherein the controller, responsive to executing the computer instructions, performs operations comprising pinging each of the set top boxes to determine the transmission delay.

13. The gateway of claim 7, wherein the controller, responsive to executing the computer instructions, performs operations comprising transmitting the delay compensation to the media server to apply the delay compensation.

14. A method comprising:
transmitting a plurality of streams of media content from a media server to a gateway associated with a premises, wherein the streams are of the same media content; and
applying a delay compensation at the gateway for delivery of the plurality of streams to one or more set top boxes of a group of set top boxes to synchronize presentation of the media content by each of the set top boxes, wherein the set top boxes are associated with the premises and each have a presentation device connected thereto, wherein the presentation devices are in proximity to each other, wherein the delay compensation is based on a transmission delay and a receipt delay, wherein the transmission delay is between each of the group of set top boxes and the gateway, and wherein the receipt delay is between the gateway and the media server.

15. The method of claim 14, wherein the delay compensation for a fastest stream of the plurality of stream is higher than other streams of the plurality of streams.

16. The method of claim 14, comprising determining the transmission delay using a ping that is sent from the gateway to each of the set top boxes.

17. The method of claim 14, comprising providing one stream of the plurality of streams from the gateway to one set top box of the group of set top boxes without applying the delay compensation.

18. The method of claim 14, wherein a selection of the group of set top boxes to be synchronized for presentation of the media content is received at one set top box of the group of set top boxes.

19. The method of claim 14, comprising receiving a calculation of the delay compensation at the media server that is transmitted from the gateway.

20. The method of claim 14, wherein the transmission delay is determined by one or more of the set top boxes.

* * * * *